(12) United States Patent
Gulistan (10) Patent No.: US 8,246,281 B2
(45) Date of Patent: Aug. 21, 2012

(54) CAPTIVE FASTENERS WITH MULTIPLE RETAINING FUNCTIONALITY

(75) Inventor: Bulent G. Gulistan, Malibu, CA (US)

(73) Assignee: Fastener Technology Corporation, N. Hollywood, CA (US)

( * ) Notice: Subject to any disclaimer, the term of this patent is extended or adjusted under 35 U.S.C. 154(b) by 39 days.

(21) Appl. No.: 12/852,418

(22) Filed: Aug. 6, 2010

(65) Prior Publication Data

US 2011/0033262 A1 Feb. 10, 2011

Related U.S. Application Data

(60) Provisional application No. 61/232,379, filed on Aug. 7, 2009, provisional application No. 61/303,265, filed on Feb. 10, 2010, provisional application No. 61/362,256, filed on Jul. 7, 2010.

(51) Int. Cl.
*F16B 21/18* (2006.01)

(52) U.S. Cl. ............... 411/353; 411/82; 411/999

(58) Field of Classification Search .......... 411/353, 411/999, 347, 337, 372, 109, 111–113, 166, 411/172–176, 517, 965, 969, 136, 197, 82–82.3, 411/930
See application file for complete search history.

(56) References Cited

U.S. PATENT DOCUMENTS

| | | | | |
|---|---|---|---|---|
| 2,949,143 A * | 8/1960 | Shur | ............................. | 411/353 |
| 3,062,253 A * | 11/1962 | Miliheiser | ..................... | 411/353 |
| 3,389,736 A * | 6/1968 | Gulistan | ....................... | 411/361 |
| 4,069,855 A * | 1/1978 | Petroshanoff | ................. | 411/105 |
| 4,387,497 A | 6/1983 | Gulistan | | |
| 4,553,890 A | 11/1985 | Gulistan | | |
| 4,621,961 A | 11/1986 | Gulistan | | |
| 4,655,658 A | 4/1987 | Gulistan | | |
| 4,815,908 A * | 3/1989 | Duran et al. | .................. | 411/353 |
| 4,828,442 A * | 5/1989 | Duran | ........................... | 411/353 |
| 4,963,063 A | 10/1990 | Gulistan | | |
| 5,073,070 A * | 12/1991 | Chang | ........................... | 411/353 |
| 5,076,747 A * | 12/1991 | Cosenza | ....................... | 411/353 |
| 5,137,406 A * | 8/1992 | Cosenza | ....................... | 411/113 |
| 5,431,517 A * | 7/1995 | Hoelle et al. | ................... | 411/183 |
| 6,860,689 B1 * | 3/2005 | Attanasio | ....................... | 411/353 |
| 7,021,876 B2 | 4/2006 | Gulistan | | |
| 7,462,008 B2 * | 12/2008 | Attanasio | ....................... | 411/353 |
| 2005/0207866 A1 * | 9/2005 | Attanasio | ....................... | 411/353 |

* cited by examiner

*Primary Examiner* — Victor Batson
*Assistant Examiner* — Tyler Johnson
(74) *Attorney, Agent, or Firm* — Fulwider Patton LLP

(57) ABSTRACT

Captive panel fasteners are configured to be held captive on a panel by multiple retaining elements. The fasteners include longitudinal grooves along a cylindrical portion of the fastener, a retaining ring over the cylindrical portion, a primary structure for retaining the retaining ring on the cylindrical portion, and secondary structure for retaining the cylindrical portion within a bore of the panel. The retaining ring includes radially inwardly extending opposing prongs that fit into the longitudinally extending grooves. A stop point may be provided in the longitudinally extending grooves, or an end of the fastener may be flared, to retain the retaining ring on the fastener. The prongs may also be slightly flexible and flared to grip the longitudinally extending grooves. The secondary structure can include one or more spring loaded pins in the fastener extending externally outward.

5 Claims, 7 Drawing Sheets

CAPTIVE FASTENERS WITH MULTIPLE RETAINING FUNCTIONALITY

CROSS-REFERENCES TO RELATED APPLICATIONS

This application is based upon and claims domestic priority from U.S. provisional Application No. 61/232,379, filed Aug. 7, 2009; U.S. provisional Application No. 61/303,265, filed Feb. 10, 2010; and U.S. provisional Application No. 61/362,256, filed Jul. 7, 2010; each of which is incorporated by reference herein.

BACKGROUND OF THE INVENTION

The present invention relates generally to captive panel fasteners, and more particularly relates to a captive panel fastener that can be held captive on a panel by multiple retaining elements integral with the fastener itself or associated with the fastener, prior to securing of a nut or other panel by the fastener.

Captive panel fasteners are used in the aerospace industry to hold aircraft panels in place. Captive panel fasteners are arranged so that a screw is held in position extending through an opening in a panel, with the threaded end of the screw extending out through the other side of the panel. In the aerospace industry, it is important that these fasteners be held properly in position, with the fastener held captive on the panel ready for the securing of the threaded end into a nut or hole. What is needed is an improved captive panel fastener design that prevents such fasteners from recessing into or out of a panel. The present invention meets this and other needs.

SUMMARY OF THE INVENTION

Briefly and in general terms, the present invention provides for improved designs for captive panel fasteners configured to be held captive on a panel by multiple retaining elements integral with the fastener itself or associated with the fastener.

Accordingly, the present invention provides for a captive panel fastener assembly with multiple retaining elements to be installed in a bore of a panel, including a fastener including a cylindrical member, a plurality of longitudinally extending grooves defined along an external surface of the cylindrical member extending between the first end portion and the second end portion of the cylindrical member, a retaining ring mounted over the cylindrical member, primary means for retaining the retaining ring on the cylindrical member, and secondary means for retaining the cylindrical member within the bore of the panel. In a presently preferred aspect, the retaining ring includes at least two radially inwardly extending opposing prongs that fit into the plurality of longitudinally extending grooves of the cylindrical member, wherein the plurality of longitudinally extending grooves include radially inner surfaces separated by a first distance, and the inwardly extending opposing prongs are separated by a second distance that is less than the first distance between the radially inner surfaces of the plurality of longitudinally extending grooves.

In one presently preferred aspect, the primary means for retaining the retaining ring on the cylindrical member includes a stop point defined in the longitudinally extending grooves at or near an extreme end of the second end portion of the cylindrical member. In another presently preferred aspect, the primary means for retaining the retaining ring on the cylindrical member includes the second end portion of the cylindrical member being flared to form a flared portion of the second end portion of the cylindrical member, so that the flared portion of the second end portion of the cylindrical member has an outer diameter that is larger than the second distance separating the inwardly extending opposing prongs of the retaining ring, to retain the retaining ring on the cylindrical member. In another presently preferred aspect, the retaining ring includes a main body formed in a plane, and the at least two radially inwardly extending opposing prongs are connected to the main body and extend radially inwardly from the main body in the plane.

In another presently preferred aspect, the primary means for retaining the retaining ring on the cylindrical member includes the at least two radially inwardly extending opposing prongs being slightly flexible and flared, and the at least two radially inwardly extending opposing prongs are biased to grip the plurality of longitudinally extending grooves and resist movement of the retaining ring along the plurality of longitudinally extending grooves along the cylindrical member.

In a presently preferred aspect, the secondary means for retaining the cylindrical member within the bore of the panel includes at least one spring loaded pin positioned internally within the cylindrical member near the second end portion of the cylindrical member, the at least one spring loaded pin extending externally through the cylindrical member. In another aspect, the at least one spring loaded pin includes a plurality of spring loaded pins.

In another presently preferred aspect, the retaining ring includes a tubular retaining sleeve including a first portion and a second portion, the first portion having a first radially outer diameter, and the second portion having a second radially outer diameter smaller than the first radially outer diameter of the first portion of the retaining sleeve, and the secondary means for retaining the cylindrical member within the bore of the panel includes the first radially outer diameter of the first portion of the retaining sleeve being larger than an inner diameter of the panel hole, and the second radially outer diameter of the second portion of the retaining sleeve being smaller than the inner diameter of the panel hole. The retaining sleeve includes a lumen therethrough with an inner diameter larger than the outer diameter of the cylindrical member, and the retaining sleeve is fitted over the cylindrical member with the first end portion of the retaining sleeve on a first side of the panel, with the prongs positioned in corresponding ones of the plurality of longitudinally extending grooves of the cylindrical member, and the second portion of the retaining sleeve is flared on a second side of the panel. In another presently preferred aspect, the bore of the panel has a conical shape, and the second portion of the retaining sleeve is flared to have a corresponding conical shape. In another presently preferred aspect, a washer is mounted in the bore of the panel adjacent to the flared portion of the second end portion of the cylindrical member, such as by an adhesive. In another presently preferred aspect, the bore of the panel has a conical shape and the washer has a corresponding conical shape.

In another presently preferred aspect, the present invention also provides for a method for installing a captive panel fastener with multiple retaining elements in a bore of a panel. The captive panel fastener includes a cylindrical member with one or more spring loaded pins positioned internally within the cylindrical member and extending externally through the cylindrical member near an end portion of the cylindrical member opposite a head of the captive panel fastener. A retaining ring including at least two radially inwardly extending, slightly flexible, flared opposing prongs is mounted over the cylindrical member with the prongs fitting into corresponding longitudinally extending grooves of the cylindrical member, so that the prongs of the retaining ring grip the cylindrical member and resist movement of the retaining ring along the longitudinally extending grooves along the cylindrical member. The one or more spring loaded pins are positioned within a bore of the panel to depress the one or more spring loaded pins within the bore of the panel, to thereby hold the captive panel fastener within the bore of the panel, and the retaining ring is positioned on a side of the panel to prevent the captive panel fastener from coming out of the bore of the panel.

In another presently preferred aspect, the present invention also provides for a method for installing a captive panel fastener with multiple retaining elements in a bore of a panel, including the steps of providing a panel including a bore therethrough, and providing a captive panel fastener including a cylindrical member. The cylindrical member includes a first end portion, a second end portion located opposite the first end portion, an externally threaded portion between the first end portion and the second end portion, and at least one spring loaded pin positioned internally within the cylindrical member near the second end portion of the cylindrical member, and extending externally through the cylindrical member. A plurality of longitudinally extending grooves are defined along an external surface of the cylindrical member extending between the first end portion and the second end portion of the cylindrical member, although the longitudinally extending grooves do not extend all the way to an extreme end of the second end or bottom end portion of the cylindrical member, but instead stop at a stop point before reaching the extreme end of the second end or bottom end portion of the cylindrical member. A retaining ring including at least two radially inwardly extending opposing prongs that fit into the plurality of longitudinally extending grooves of the cylindrical member is mounted over the cylindrical member, using an installation tool a tool end portion having a beveled portion on one side of the tool end portion and a slot on an opposing side of the tool end portion. The captive panel fastener is inserted into the bore of the panel, a first one of the prongs of the retaining ring is inserted into a first one of the plurality of longitudinally extending grooves, and the installation tool is positioned such that a second one of the prongs of the retaining ring is disposed inside the slot of the installation tool. The retaining ring is then pulled with the installation tool so that the second of the prongs are inserted into a second of the longitudinally extending grooves. The captive panel fastener is pulled through the bore of the panel, while positioning the at least one spring loaded pin near the second end portion of the cylindrical member within the bore of the panel to depress the at least one spring loaded pin within the bore of the panel, to thereby hold the captive panel fastener within the bore of the panel, and the retaining ring is positioned on a side of the panel to prevent the captive panel fastener from out of the bore of the panel.

These and other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Referring to the drawings, which are provided by way of example, and not by way of limitation, and in which like elements are identified with like reference numbers, in a first presently preferred embodiment, the invention provides for a captive panel fastener assembly 40 with multiple retaining elements including a captive panel fastener 42, such as a screw or bolt, for example. The captive panel fastener typically includes a head 44 attached to a cylindrical member or shank 46. The cylindrical member has an unthreaded first end or top end portion 48 which connects to the head, a second end or bottom end portion 50, which is located opposite the first end or top end portion, and an externally threaded portion 52 between the unthreaded first end or top end portion and the second end or bottom end portion.

Figure 2:
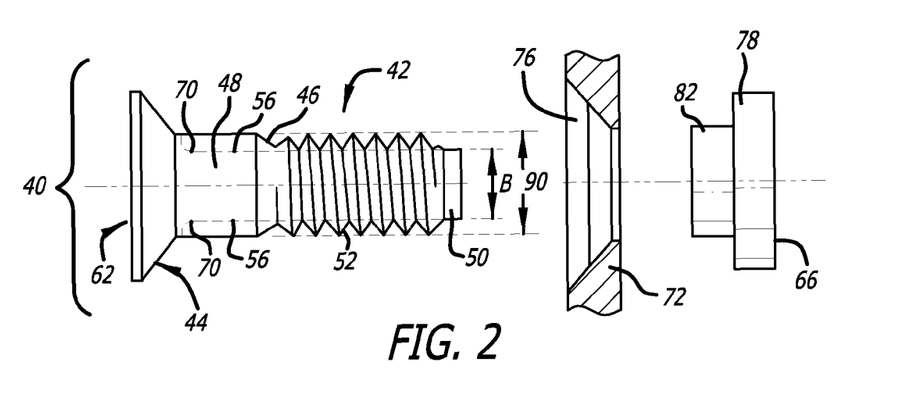
FIG. 2 is an exploded view of the captive panel fastener assembly, showing a screw type fastener, retaining sleeve and a partial sectional view of a panel with a washer glued onto the panel according to the invention.
Figure 9:
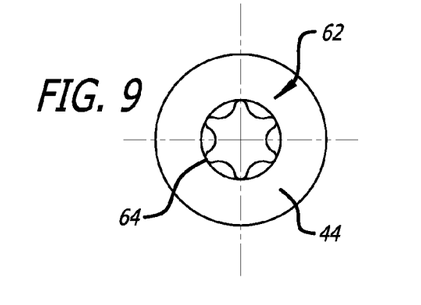
FIG. 9 is a top view of a screw type fastener according to the invention.

As is illustrated in FIG. 2, a plurality of longitudinally extending grooves or slots 56, such as two longitudinally extending grooves or slots, for example, run along the cylindrical member between the first end or top end portion and the second end or bottom end portion. The longitudinally extending grooves or slots may have a recess depth of approximately 0.055 to 0.045 inches in a cylindrical member having an outer diameter of approximately 0.2459 to 0.2490 inches, for example. The head of the captive panel fastener may include any type of driving arrangement 62, such as a conventional slot, a Phillips, or Allen head recess, or the like. FIG. 9 illustrates a top view of the head in the shape of a hexagon having a six-lobe recess 64. A top view of the head of the captive panel fastener is shown in FIG. 9. In the embodiment of the invention shown, the head of the screw includes a six-lobed recess compatible with a mating tool to allow torqueing of the screw. However, those skilled in the art will understand that a head of any shape and recessed configuration may be provided.

Figure 3A:
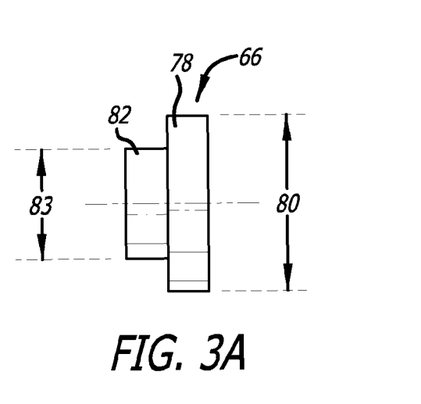
FIG. 3A is an elevational view of the sleeve of the captive panel fastener assembly of FIG. 2.
Figure 3B:
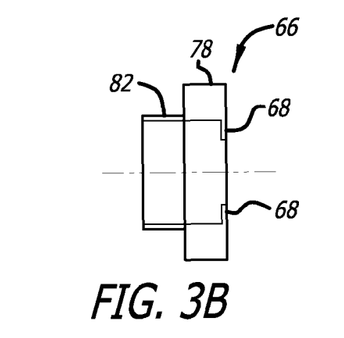
FIG. 3B is a cross-sectional view of the sleeve of the captive panel fastener assembly of FIG. 2.
Figure 4:
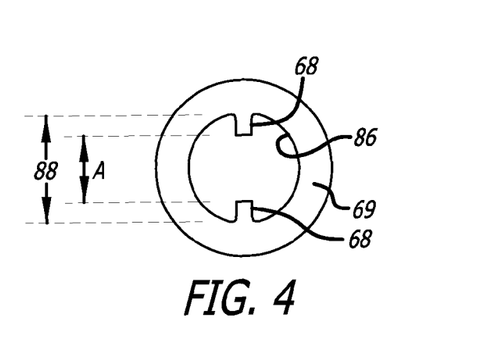
FIG. 4 is a plan view of the sleeve of FIG. 3A.

The captive panel fastener assembly also includes a retaining sleeve 66, illustrated shown in FIGS. 3A, 3B and 4. The retaining sleeve includes at least two radially inwardly extending opposing prongs 68 that fit into the longitudinally extending grooves of the cylindrical member of the fastener. The opposing prongs are formed to extend in the same plane as the main body 69 of the retaining ring, and the opposing prongs are separated by a first distance A shown in FIG. 4 that is slightly less than the distance B between the radially inner surfaces, floors or bottoms 70 of the plurality of longitudinally extending grooves or slots along the cylindrical member.

FIGS. 2-8 illustrate installation of a retaining sleeve onto a captive panel fastener for installation of the captive panel fastener assembly into a panel 72, including a hole or bore 74 for inserting the captive panel fastener of the invention, or another fastener, such as a screw or bolt, for example.

Figure 1:
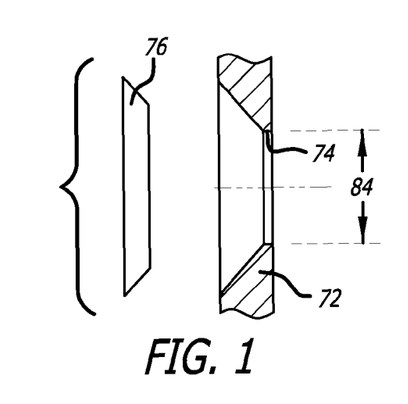
FIG. 1 is a cross sectional view through a conical washer and panel for preparation of the captive panel fastener assembly according to the invention.

As is illustrated in FIG. 1, a washer 76 may be installed into the hole of a panel by an adhesive or glue, such as Permabond Super Glue or Loctite Super Bonder for example. Alternately, the washer may be installed using other adhesives known to those skilled in the art. In one embodiment, the washer can be a conical-shaped washer, and the hole of the pane has a corresponding conical shape for receiving the washer. Those skilled in the art will appreciate that other shaped washers may be used and installed onto the panel. Once the washer is installed onto the panel, the sleeve and screw assembly may then be installed in the panel, with the washer affixed to the hole of the panel, as is illustrated in FIG. 2.

The retaining sleeve includes a first portion 78 with a first radially outer diameter 80, and a second portion 82 with a second radially outer diameter 83 smaller than the first radially outer diameter. The first radially outer diameter is preferably larger than the inner diameter 84 of the panel hole, and the second radially outer diameter is preferably smaller than the inner diameter of the panel hole. The retaining sleeve includes a lumen 86 therethrough with an inner diameter 88 larger than an outer diameter 90 of the cylindrical shank of the fastener, so that the sleeve can be fitted over the cylindrical shank of the fastener. The retaining sleeve is mounted over the end of the captive panel fastener with the prongs positioned in the corresponding grooves or slots of the cylindrical member. The threads of the screw may be rolled onto the shank of the screw with the sleeve in place. As is illustrated in FIG. 2, the screw and sleeve are installed into the panel resulting in the assembly illustrated in FIG. 5.

Figure 5:
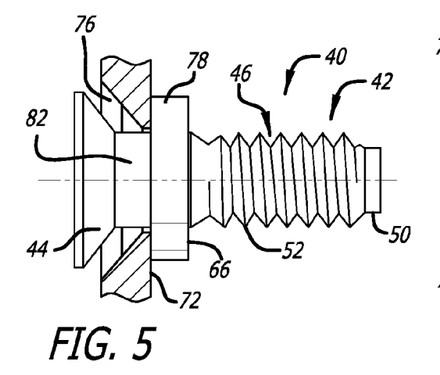
FIG. 5 is a partial cross-sectional view through a screw type fastener and retaining sleeve installed into a panel according to the invention.
Figure 6:
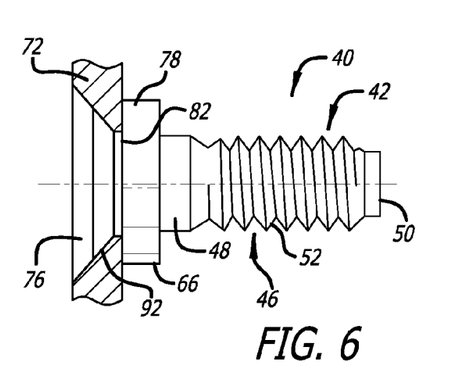
FIG. 6 is a partial cross-sectional view illustrating the flared retaining sleeve according to the invention.
Figure 7:
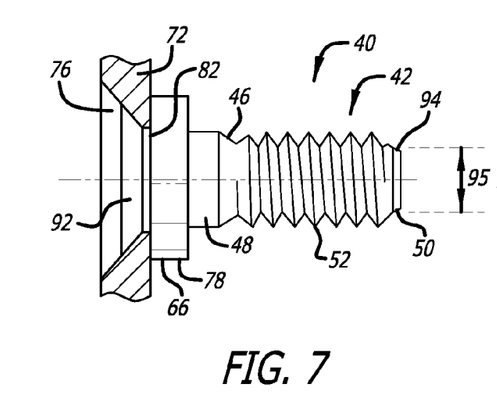
FIG. 7 is a partial cross-sectional view illustrating the flared end of the screw type fastener according to the invention.
Figure 8:
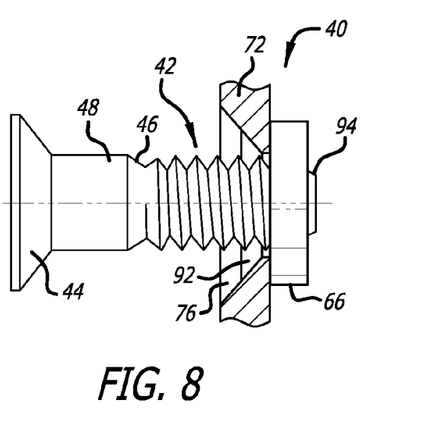
FIG. 8 is another partial cross-sectional view illustrating the flared end of the screw type fastener to the invention.

When the retaining sleeve is installed over the captive panel fastener and in the panel hole, as illustrated in FIGS. 5 and 6, the second portion of the retaining sleeve may be flared to form a flared portion 92 of the second portion of the retaining sleeve as shown in FIG. 6, such as by using a tool T5648-12, for example. Optionally, in alternate embodiments, those skilled in the art will appreciate other tools may be used to flare the second portion of the retaining sleeve. Once the second portion of the retaining sleeve is flared, the second end or bottom end portion of the cylindrical shaft of the fastener is ready to be flared, as shown in FIG. 6. A tool T2797-12 can be used to flare the second end or bottom end portion of the cylindrical shaft of the fastener to form a flared second end portion 94 of the cylindrical member of the fastener, as shown in FIG. 7, so that the flared portion of the second end or bottom end portion of the cylindrical shaft of the fastener has an outer diameter 95 that is larger than the inner diameter of the prongs of the retaining sleeve, to retain the captive panel fastener within the retaining sleeve. In optional embodiments, those skilled in the art will appreciate other tools may be used to flare the second end or bottom end portion of the cylindrical shaft of the fastener. FIGS. 7 and 8 both illustrate a captive panel fastener/sleeve assembly where the second end or bottom end portion of the cylindrical shaft of the captive panel fastener has been flared. The retaining sleeve is typically positioned on a back side of the panel to prevent the fastener from sliding back out. The combination of the retaining sleeve and the flaring of the second end or bottom end portion of the cylindrical shaft of the fastener hold the captive panel fastener in place in the panel.

Referring to FIGS. 10-20, in a second embodiment, the present invention provides for a captive panel fastener assembly 140 with multiple retaining elements including a captive panel fastener 142 having a head 144 attached to a cylindrical member or shank 146, shown in FIGS. 10-13. The cylindrical member has an unthreaded first end or top end portion 148, which connects to the head, a second end or bottom end portion 150, which is located opposite the first end or top end portion, and an externally threaded portion 152 between the unthreaded first end or top end portion and the second end or bottom end portion. The cylindrical member includes one or more pins 154 positioned internally within the cylindrical member near the second end or bottom end portion. The one or more pins are internally positioned, are spring loaded and are designed to extend out through the cylindrical member. Further, a plurality of longitudinally extending grooves or slots 156 run along the cylindrical member between the first end or top end portion and the second end or bottom end portion. The longitudinally extending grooves preferably do not extend all the way to the extreme bottom end 160 of the second end or bottom end portion of the cylindrical member or shank, but instead stop at a stop point 158 before reaching the outer or extreme bottom end 160 of the second end or bottom end portion of the cylindrical member or shank.

The head of the captive panel fastener may include any type of driving arrangement 162, such as a conventional slot, a Phillips, or Allen head recess, or the like. FIG. 1 illustrates a top view of the head in the shape of a hexagon having a six-lobe recess 164. However, those skilled in the art will understand that a head of any shape and recessed configuration may be provided.

Figures 10, 11:
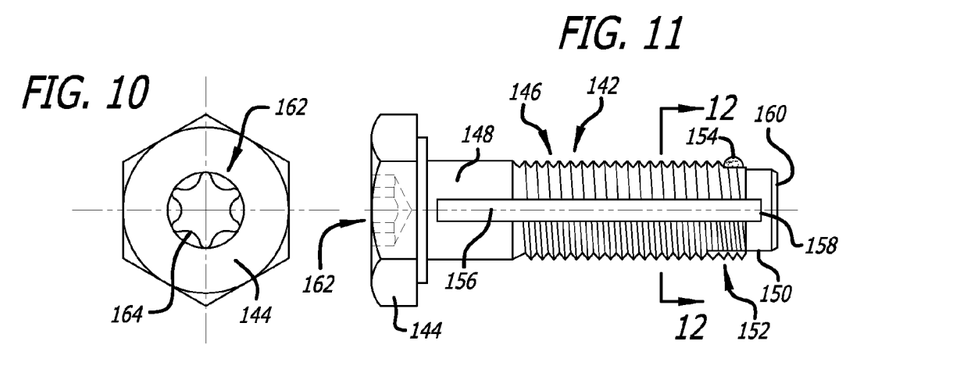
FIG. 10 is a top view of the fastener according to the invention.
FIG. 11 is a side view of a fastener according to the invention.
Figure 12:
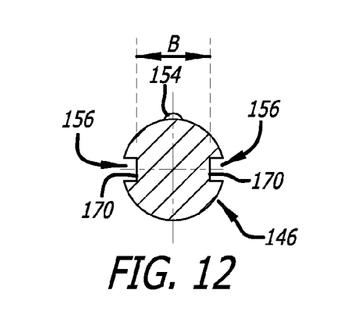
FIG. 12 is a cross sectional view of the fastener through the line 12-12, according to the invention.

Referring now to FIG. 12, a cross section through the line 12-12 of FIG. 11 is shown. FIG. 12 illustrates a different view of the longitudinally extending grooves.

Figure 13:
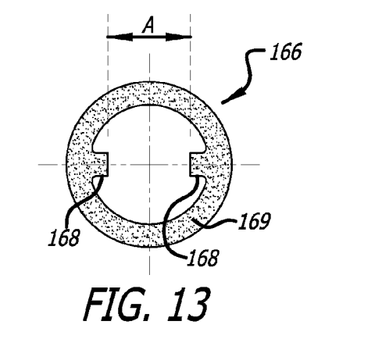
FIG. 13 is a side view of the fastener installed into a panel according to an embodiment of the invention.
Figures 14, 15:
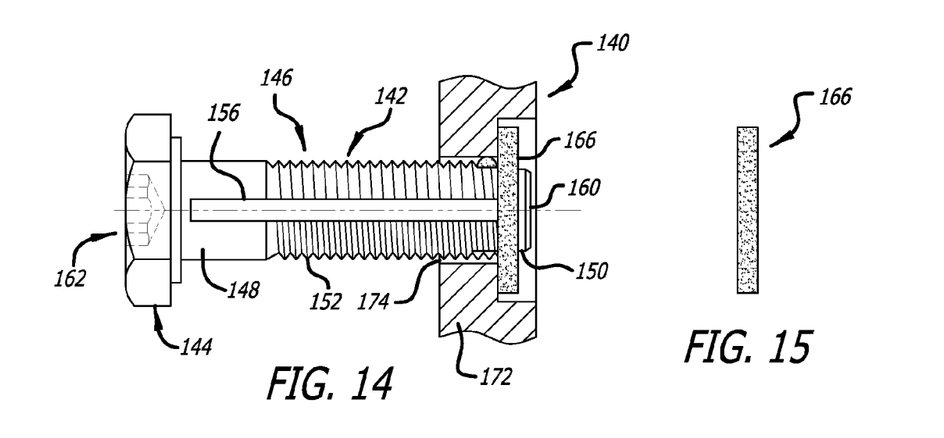
FIG. 14 is a plan view of a retaining ring with inwardly extending prongs according to the invention.
FIG. 15 is a side view of the retaining ring according to the invention.

The captive panel fastener assembly also includes a retaining ring 166, illustrated shown in FIGS. 11 and 13-15. The retaining ring includes at least two radially inwardly extending opposing prongs 168 that fit into the longitudinally extending grooves of the cylindrical member of the fastener. The opposing prongs are formed to extend in the same plane as the main body 169 of the retaining ring, and the opposing prongs are separated by a first distance A shown in FIG. 14 that is slightly less than the distance B between the radially inner floors or bottoms 170 of the plurality of longitudinally extending grooves or slots along the cylindrical member, shown in FIG. 12. FIG. 13 illustrates a retaining ring installed onto a captive panel fastener in which the assembly has been installed into a panel 172, including a hole or bore 174 for inserting the captive panel fastener of the invention, or another fastener, such as a screw or bolt, for example.

Figure 16:
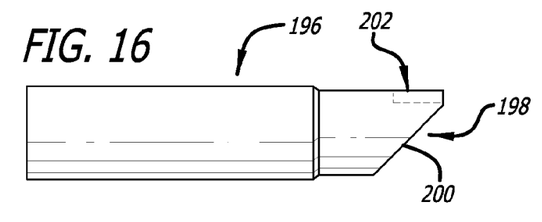
FIG. 16 illustrates a tool for use with installing a retaining ring onto a captive fastener according to the invention.
Figure 17:
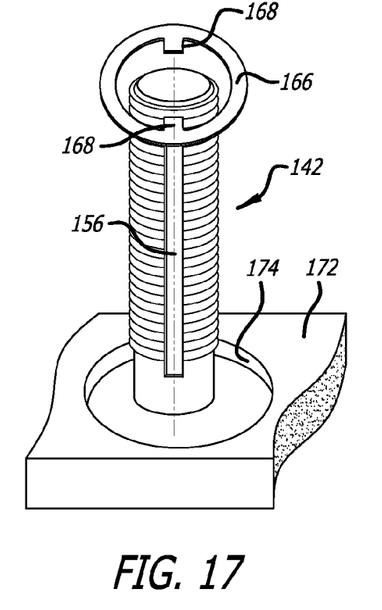
FIG. 17 illustrates one prong of a retaining ring installed into the groove of a captive fastener according to the invention.
Figure 18:
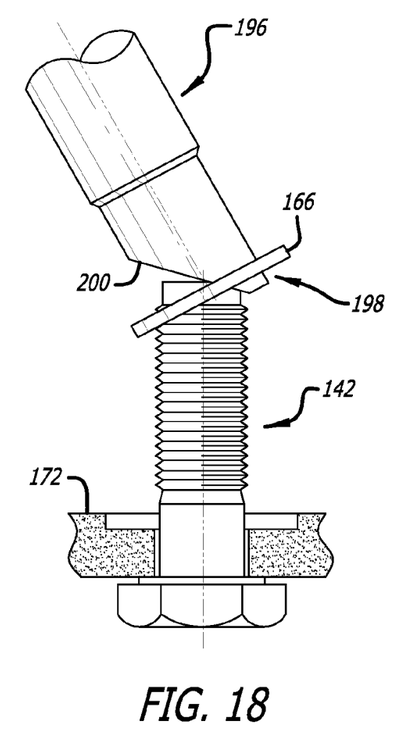
FIG. 18 illustrates a tool inserting the second prong of a retaining ring onto a captive fastener according to the invention.

FIG. 16 illustrates an installation tool 196 intended for use in installing the retaining ring over the second end portion of the cylindrical member of the captive panel fastener. The installation tool includes a tool end portion 198 having a beveled portion 200 on one side of the tool end portion, and a slot 202 on an opposing side of the tool end portion. A captive panel fastener is inserted into a panel as shown in FIG. 17. Then, one of the prongs of the retaining ring is inserted into one of the longitudinally extending grooves. The installation tool is then positioned such that another one of the prongs of the retaining ring that is not inserted in one of the longitudinally extending grooves is inside the tool's slot (as shown in FIG. 18). The installation tool then stretches, or pulls, the retaining ring so that the prong may be inserted into the other longitudinally extending groove, thus securing the retaining ring with the captive panel fastener. The captive panel fastener is then pulled through the panel and the pins positioned near the end of the cylinder portion are depressed within the panel, thus holding the fastener into place via a spring action of the pins. Further, the retaining ring is positioned on a back side of the panel to prevent the fastener from sliding back out. The combination of the retaining ring and the one or more pins hold the captive panel fastener in place.

Figure 19:
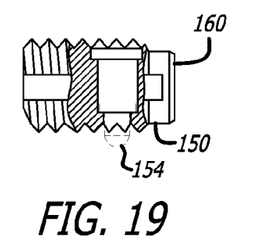
FIG. 19 illustrates a cross sectional view of a portion of the captive fastener in which a spring-loaded pin is fully extended.
Figure 20:
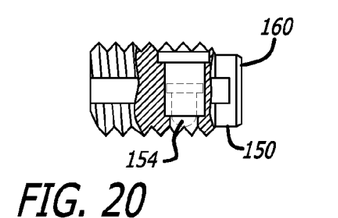
FIG. 20 is a cross sectional view of a portion of the captive fastener in which a spring-loaded pin is depressed.

FIG. 19 illustrates a cross-sectional view of a portion of the fastener in which the pin is extended outwardly. FIG. 20 illustrates a cross-sectional view of a portion of the fastener in which the pin is depressed inwardly.

Figure 21:
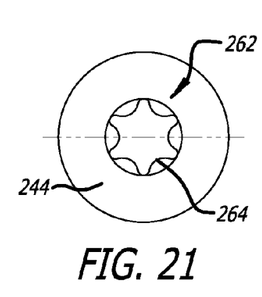
FIG. 21 is a top view of the fastener according to the invention.
Figure 22:
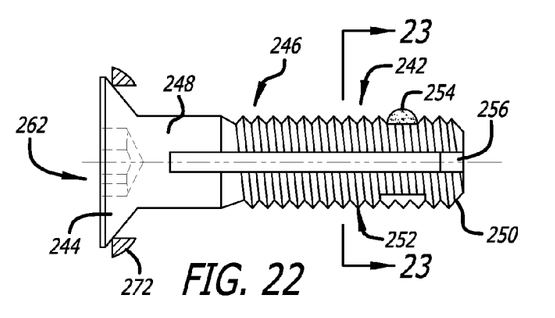
FIG. 22 is a side view of a fastener of FIG. 21, according to the invention.
Figure 23:
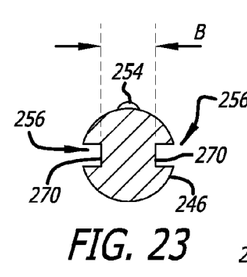
FIG. 23 is a cross sectional view of the fastener through the line 23-23 of FIG. 22, according to the invention.

Referring to FIGS. 21-32, in a third embodiment, the present invention provides for a captive panel fastener assembly 240 with multiple retaining elements including a captive panel fastener 242 with multiple retaining functionality. Referring to FIGS. 21-24, the captive panel fastener includes a head 244 attached to a cylindrical member 246. The cylindrical member (also called the shank) has an unthreaded first end or top end portion 248, which connects to the head, a second end or bottom end portion 250 which is located opposite the first end or top end portion, and an externally threaded portion 252 between the unthreaded first end or top end portion and the second end or bottom end portion. The cylindrical member includes one or more pins 254 positioned internally within corresponding apertures 255 in the cylindrical member near the second end or bottom end portion. The one or more pins are internally positioned, are spring loaded, and are designed to extend out through the cylindrical member. A plurality of longitudinally extending grooves (or slots) 256 run along the cylindrical member between the first end or top end portion and the second end or bottom end portion. FIG. 23 illustrates a cross sectional view of the longitudinally extending grooves. The head of the captive panel fastener may include any type of driving arrangement 262, such as a conventional slot, a Phillips, or Allen head recess, or the like. FIG. 21 illustrates a top view of the head in the shape of a hexagon having a six-lobe recess 264. However, those skilled in the art will understand that a head of any shape and recessed configuration may be provided.

Figure 26:
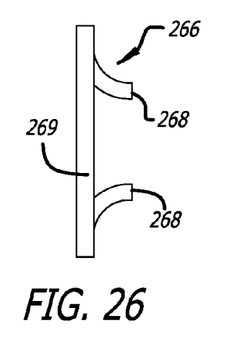
FIG. 26 is a side view of the retaining ring of FIG. 25.
Figure 27:
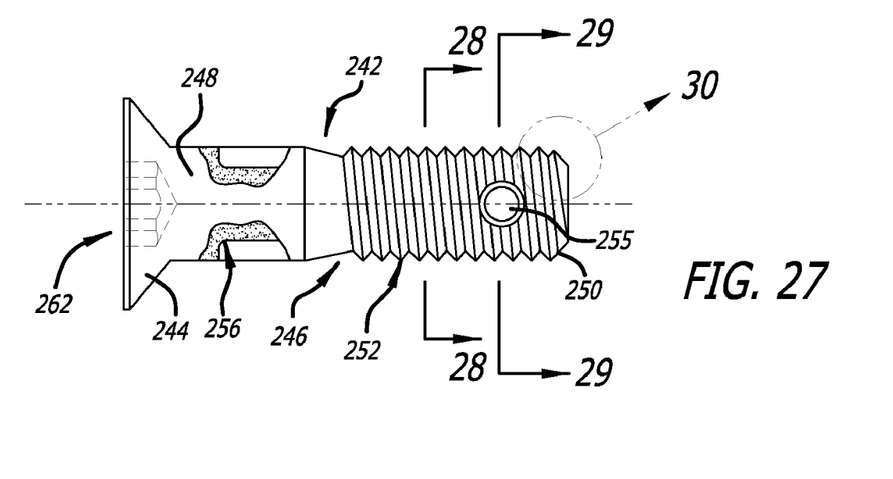
FIG. 27 is a top plan view of the fastener of FIG. 21.
Figure 28:
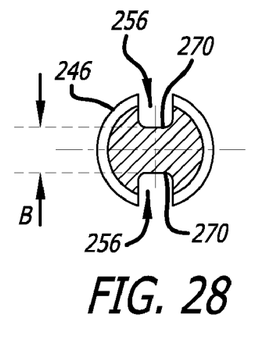
FIG. 28 is a cross-sectional view taken along line 28-28 of FIG. 27.
Figure 29:
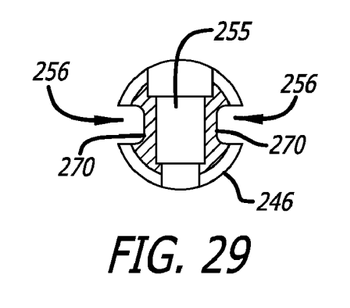
FIG. 29 is a cross-sectional view taken along line 29-29 of FIG. 27.
Figure 30:
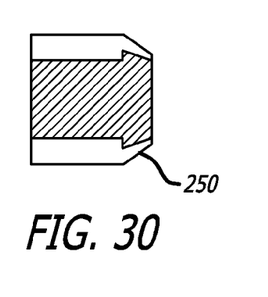
FIG. 30 is a detail view of a portion of FIG. 27.
Figures 31, 32:
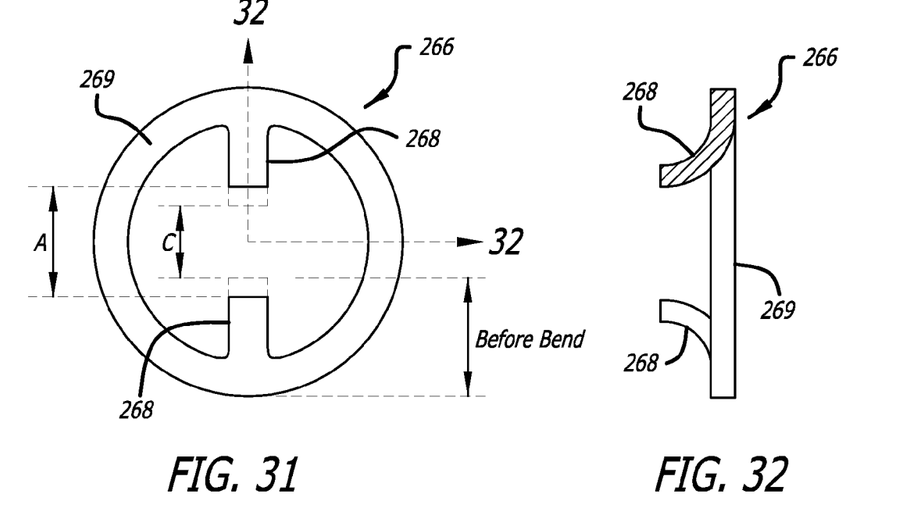
FIG. 31 is an enlarged plan view of the retaining ring of FIG. 25, illustrating the formation of the radially inwardly extending, slightly flexible, flared opposing prongs of the retaining ring according to the invention.
FIG. 32 is a partial sectional view of the retaining ring, taken along line 32-32 of FIG. 21.

The captive panel fastener assembly includes a retaining ring 266 as shown in FIGS. 25, 26, 31 and 32. The retaining ring includes at least two radially inwardly extending, slightly flexible, flared opposing prongs 268 that fit into the longitudinally extending grooves of the cylindrical member of the fastener. In forming the retaining ring, initially these prongs are in the same plane as the main body 269 of the retaining ring, and the opposing prongs are separated by a first distance C shown in FIG. 31 that is slightly less than the distance B between the radially inner surfaces, floors or bottoms 270 of the plurality of longitudinally extending grooves or slots along the cylindrical member, such as approximately 0.114 to 0.111 inches, for example. As is illustrated in FIGS. 26 and 32, the prongs are preferably bent to flare in a direction outwardly from the plane of the main body of the retaining ring, so that the opposing prongs are separated by a distance A that is slightly less than the distance between the radially inner floors or bottoms of the plurality of longitudinally extending grooves or slots along the cylindrical member, and that is slightly greater than the distance C, as is illustrated in FIG. 31. The flared prongs function in a manner similar to leaf springs in that the flared prongs give slightly and at the same time are biased to exert a pressure on the floors or bottoms of the plurality of longitudinally extending grooves or slots along the cylindrical member, to grip the fastener and resist movement of the retaining ring along the plurality of longitudinally extending grooves or slots along the cylindrical member. The prongs are preferably bent to precisely apply a desired measure of spring force against the plurality of longitudinally extending grooves or slots.

Figure 24:
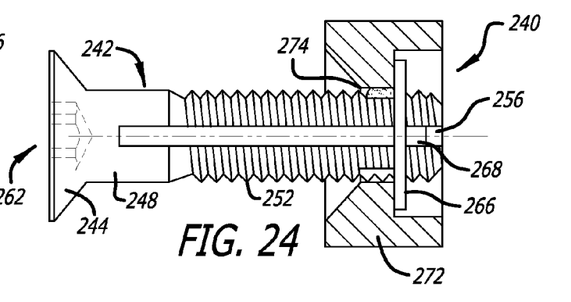
FIG. 24 is a side view of the fastener of FIG. 21 with a retaining ring mounted on the fastener, showing the fastener installed into a panel.
Figure 25:
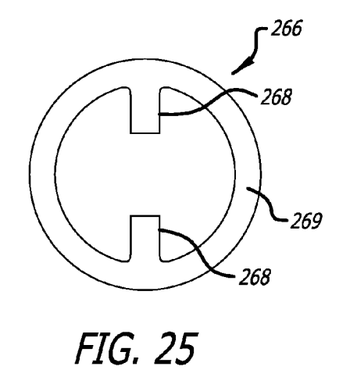
FIG. 25 is a plan view of the retaining ring with radially inwardly extending prongs of FIG. 24.

FIG. 24 illustrates a retaining ring installed onto a captive panel fastener in which the assembly has been installed into a panel 272. The panel includes a hole or bore 274 for inserting the captive panel fastener of the invention, or a screw or bolt, for example.

The retaining ring is mounted over the end of the captive panel fastener with the flared prongs positioned in the corresponding grooves or slots of the cylindrical member. The captive panel fastener is pulled through the panel, and the pins near the end of the cylinder portion are pulled within the bore of the panel so that the pins are depressed within the bore of the panel to be biased in engagement with the inner surface of the bore of the panel, thus holding the fastener into place via a spring action of the pins. The retaining ring is positioned on a back side of the panel to prevent the fastener from sliding back out. The combination of the retaining ring and the one or more pins hold the captive panel fastener in place.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A captive panel fastener assembly to be installed in a bore of a panel, comprising:
   a fastener including a head attached to a cylindrical member, said cylindrical member including a first end portion connected to said head, a second end portion located opposite the first end portion, and an externally threaded portion between said first end portion and said second end portion;
   a plurality of longitudinally extending grooves defined along an external surface of the cylindrical member extending between said first end portion and said second end portion of said cylindrical member;
   a retaining ring mounted over said cylindrical member, said retaining ring including at least two radially inwardly extending opposing prongs that fit into said plurality of longitudinally extending grooves of the cylindrical member, wherein said plurality of longitudinally extending grooves include radially inner surfaces separated by a first distance, and said inwardly extending opposing prongs being separated by a second distance that is less than said first distance between said radially inner surfaces of said plurality of longitudinally extending grooves, said retaining ring includes a tubular retaining sleeve including a first portion and a second portion, said first portion having a first radially outer diameter, and said second portion having a second radially outer diameter smaller than said first radially outer diameter of said first portion of said tubular retaining sleeve, said first radially outer diameter of said first portion of said tubular retaining sleeve being larger than an inner diameter of the panel hole, and said second radially outer diameter of said second portion of said tubular retaining sleeve being smaller than the inner diameter of the panel hole, wherein said cylindrical member has an outer diameter, and said tubular retaining sleeve includes a lumen therethrough with an inner diameter larger than said outer diameter of the cylindrical member, and said tubular retaining sleeve is fitted over said cylindrical member with said first end portion of said tubular retaining sleeve on a first side of the panel, with said prongs positioned in corresponding ones of said plurality of longitudinally extending grooves of the cylindrical member, and said second portion of said tubular retaining sleeve is flared on a second side of the panel, wherein the bore of the panel has a conical shape, and said second portion of said tubular retaining sleeve is flared to have a corresponding conical shape;
   primary means for retaining said retaining ring on said cylindrical member; and
   a washer mounted in the bore of the panel by an adhesive adjacent to said flared portion of said second portion of the tubular retaining sleeve.

2. The captive panel fastener assembly of claim 1, wherein said retaining ring comprises a main body formed in a plane, and said at least two radially inwardly extending opposing prongs are connected to said main body and extend radially inwardly from said main body in said plane.

3. The captive panel fastener assembly of claim 1, wherein said primary means for retaining said retaining ring on said cylindrical member comprises said second end portion of the cylindrical member being flared to form a flared portion of said second end portion of the cylindrical member, so that said flared portion of said second end portion of the cylindrical member has an outer diameter that is larger than said second distance separating said inwardly extending opposing prongs of said retaining ring, to retain said retaining ring on said cylindrical member.

4. The captive panel fastener assembly of claim 1, wherein said washer has a conical shape corresponding to the conical shape of the bore of the panel.

5. A captive panel fastener assembly to be installed in a bore of a panel, comprising:
   a captive panel fastener including a cylindrical member, a head attached to said cylindrical member, said cylindrical member including a first end portion connected to said head, a second end portion located opposite the first end portion, and an externally threaded portion between said first end portion and said second end portion;
   a plurality of longitudinally extending grooves defined along an external surface of the cylindrical member extending between said first end portion and said second end portion of said cylindrical member;
   a tubular retaining sleeve mounted over said cylindrical member, said tubular retaining sleeve including at least two radially inwardly extending opposing prongs that fit into said plurality of longitudinally extending grooves of said cylindrical member, said plurality of longitudinally extending grooves having radially inner surfaces separated by a first distance, and said inwardly extending opposing prongs being separated by a second distance that is less than said first distance between said radially inner surfaces of said plurality of longitudinally extending grooves, wherein said tubular retaining sleeve includes a first portion and a second portion, said first portion having a first radially outer diameter, and said second portion having a second radially outer diameter smaller than said first radially outer diameter of said first portion of said tubular retaining sleeve, wherein said first radially outer diameter of said first portion of said tubular retaining sleeve is larger than an inner diameter of the panel hole, and said second radially outer diameter of said second portion of said tubular retaining sleeve is smaller than the inner diameter of the panel hole, wherein said cylindrical member has an outer diameter, and said tubular retaining sleeve includes a lumen therethrough with an inner diameter larger than said outer diameter of the cylindrical member, and said tubular retaining sleeve is fitted over said cylindrical member with said first portion of said tubular retaining sleeve on a first side of the panel, with said prongs positioned in corresponding ones of said plurality of longitudinally extending grooves of the cylindrical member, wherein the bore of the panel has a conical shape, and said second portion of said tubular retaining sleeve is flared on a second side of the panel to have a corresponding conical shape, and wherein said second end portion of the cylindrical member is flared to form a flared portion of said second end portion of the cylindrical member, so that said flared portion of said second end portion of the cylindrical member has an outer diameter that is larger than said second distance separating said inwardly extending opposing prongs of said tubular retaining sleeve, to retain the captive panel fastener within the tubular retaining sleeve; and
   a washer mounted in the bore of the panel by an adhesive adjacent to said flared portion of said second portion of the tubular retaining sleeve.

* * * * *